Oct. 27, 1931.    G. KRAMER    1,828,934
LUBRICATING APPARATUS FOR AUTOMOBILES AND THE LIKE
Filed Dec. 11, 1929
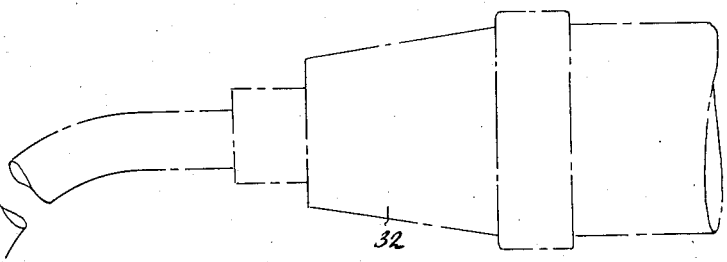
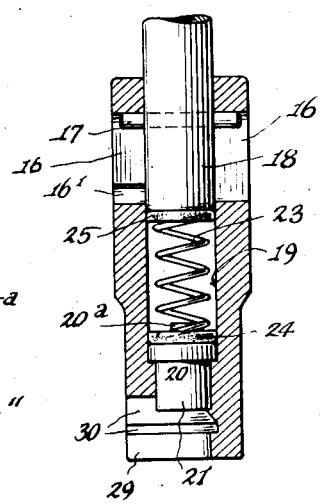
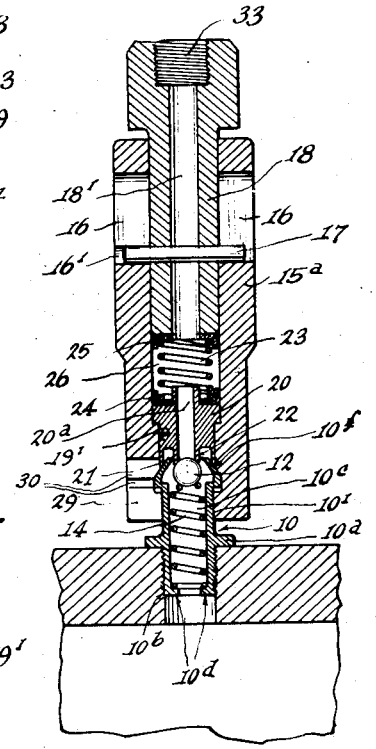
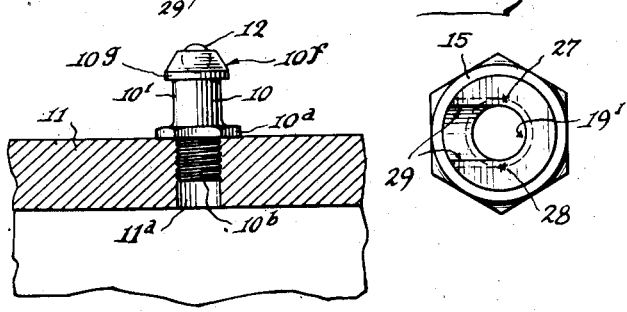
George Kramer
INVENTOR
BY Victor J. Evans
ATTORNEY
WITNESS Patented Oct. 27, 1931

1,828,934

UNITED STATES PATENT OFFICE

GEORGE KRAMER, OF NEW YORK, N. Y., ASSIGNOR TO MARIE SELMA KRAMER, OF NEW YORK, N. Y.

LUBRICATING APPARATUS FOR AUTOMOBILES AND THE LIKE

Application filed December 11, 1929. Serial No. 413,376.

This invention relates to lubricating devices and particularly to systems adapted to apply a lubricant under pressure to surfaces requiring lubrication.

The general object of the present invention is to provide an improved means for attaining pressure lubrication to a part to be lubricated so that the lubricator is held firmly while in communication with the surface to be lubricated during the process of supplying the lubricant under pressure.

A further object is to provide an improved means for attaching the delivery end of a pressure lubricator to a suitable nipple or receiving opening in such a fashion that the lubricator may be easily and conveniently detached.

Another object is to provide an improved attaching means for the delivery end of a pressure lubricator which does not become detached while lubricant under pressure is being supplied to the part to be lubricated.

A further object is to provide a means for attaching a pressure lubricator in which the joints are tight against leakage of lubricant and prevents the lubricant from being spread over the outside of the opening or nipple through which the lubricant is supplied to the part to be lubricated.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Figure 1 is a vertical elevation of the present invention showing the means for attaching the lubricator in position ready to be inserted over the nipple through which lubricant is passed to the surfaces to be lubricated.

Figure 2 is a vertical section showing the delivery end of the pressure lubricator in engagement with the nipple for the purpose of inserting lubricant under pressure to the surfaces to be lubricated.

Figure 3 is a vertical section through the delivery end of the lubricator showing the relation of the parts in the retracted position which the parts occupy when the delivery end is out of engagement with the nipple.

Figure 4 is a detail view looking towards the end of the barrel.

It is customary to lubricate certain parts, inaccessible or otherwise, of various machines such as automobiles, for instance, by means of lubricant such as oil or grease under pressure in order to insure the penetration of the lubricant to all parts of the surface to be lubricated. Such lubricator commonly comprise some form of pressure applying means such as a piston actuated by a screw, the piston moving within a cylinder and acting upon oil or grease contained in the cylinder, so as to drive the lubricant under a high pressure to a part in communication with the cylinder. The pressure lubricator is usually connected to the part or surfaces to be lubricated through the medium of a flexible tube capable of withstanding the high pressure produced and is commonly attached to a suitable nipple by means of a detachable connector permitting easy and convenient attachment to or detachment from the nipple. It is the general purpose of this invention to provide a novel arrangement of parts which provides a positive and efficient means for attaching the delivery end of the tube from the pressure lubricator to the part or surface to be lubricated.

Figures 1 and 3 show the general arrangement of the delivery end of the tube from the pressure lubricator while Figure 2 shows the relative positions of the parts while the lubricator is being used to supply lubricant under pressure.

The reference character 10 represents a nipple which is screwed firmly into a hole 11a communicating with the parts to be lubricated. The nipple 10 is provided with a flange 10a for the purpose of rendering the nipple pressure tight which bears firmly against the outside surface 11 of the part to which the nipple is applied. The barrel 10' of the nipple 10 is provided with an internal chamber 10c housing a spring abutting at its lower end against an internal flange 10d formed in the nipple 10.

The upper end of the nipple 10 is formed substantially as shown in Figures 1 and 2 with a conical surface 10f and a shoulder 10g for a purpose to be explained later. A ball 12 lies within the enlargement formed in the interior of the nipple 10 below the opening in the end of the nipple and is spring urged upwardly by means of a spring 14, so as to close the hole or opening in the end of the nipple. The ball 12 acts as a check valve to prevent escape of lubricant through the nipple after the pressure applied by the piston has been removed and acts in an old and well-known manner.

The delivery end of the pressure lubricator is attached to the nipple 10 by means comprising a barrel 15 slidably and rotatably mounted upon a member to which is connected the tube leading to the pressure chamber of the lubricator. The circumferential and axial movement of the barrel 15 is restricted by means of L-shaped slots cut in opposite sides of a hexagonal enlargement 15a of the barrel, the slots embracing a pin 17 projecting through the member 18 to which the tube leading from the chamber of the pressure lubricator is attached. The construction is such that the pin 17 normally occupies a position in the extreme upper ends of the L-shaped slots 16 and is held there under the influence of a spring.

The member 18 is inserted in a chamber 19 formed in the enlarged portion 15a of the barrel 15. A slidable member 20 provided with a central passage 20a for permitting lubricant to pass through, is held by means of a spring against the shoulder 19' formed by the constriction of the passage through the barrel 15. The lower portion of the member 20 is provided with two flanges 21 and 22 adapted to co-operate with the upper end of the nipple 10 in a manner to be more clearly explained later. Interposed between the member 18 and the member 20 is a coil spring 23 which is seated in flanged packing rings 24 and 25, the effect of the spring being to keep the member 20 firmly against its seat which consists of the constriction 19' and at the same time keeps the pin 17 normally in engagement with the upper end of the slot 16 formed in the enlargement 15a of the barrel 15. This construction is very clearly shown in Figure 3 in which the parts are in their normal position with the barrel 15 out of engagement with the nipple 10.

The barrel 15 is adapted to be attached to the nipple 10 and for that purpose is provided with a cut-away portion at its lower end which permits the barrel to be placed over the nipple. The cut-away portion comprises a cylindrical portion 29 adapted to fit against the cylindrical portion 10' of the barrel of the nipple 10 and is also provided with a cut-away portion 30 of the same general contour as the conical surface 10f and the cylindrical surface 10g formed in the head or enlargement in the upper end of the nipple 10. This construction is clearly shown in Figures 1, 3 and 4 from which it will be seen that the general contour of the cuts 29 and 30 is such that the outline of the head of the nipple 10 has been exactly reproduced so as to permit the barrel 15 to be slid sidewise over the head of the nipple 10.

The pressure lubricator may be constructed in any desired manner and has been shown in dotted lines in Figure 1. As it forms no part of this invention it needs no further description herein. It is sufficient to mention that a suitable tube 31 connects the pressure chamber of the lubricator 32 to the member 18 by means of a suitable union which may be screwed into the threaded portion 33 in the upper end of the member 18.

The delivery end of the tube 31 from the pressure lubricator 32 is attached to the nipple 10 in the following manner for the purpose of inserting lubricant: The barrel 15 is grasped in the hand and the cut-away portion in the lower end is first brought to a position to one side of the head of the nipple 10. The barrel is then moved sidewise to the left as viewed in Figures 2 and 3 until the head of the nipple enters the opening with the cylindrical portion 10' of the barrel of the nipple 10 lying in the cut-away portion 29 and the surfaces 10f and 10g co-acting with the cut-away portions 30. The barrel 15 may now be moved still further sidewise, that is to the left as illustrated in Figures 2 and 3. During the further movement of the barrel 15 in this manner the conical surface 10f will engage the lower edge of the flange 21 formed in member 20 which projects downwardly sufficiently to lie in the path of motion of the conical surface 10f, and will cam the member 20 upwardly against the pressure of the spring 23 until the rear wall of the cut-away portion in the lower end of the barrel 15 stops further movement of the barrel. When the barrel 15 reaches this point the flange 22 will overlie the opening in the end of the nipple 10 and the pressure of the spring 23 will cause the member 20 to snap down until the flange 21 rests on the conical surface 10f of the nipple 10 while the flange 22 will enter the opening in the end of the nipple, at the same time forcing the ball 12 away from its seat slightly. The flange 22 is made of a sufficient length and external diameter so as to permit it to fit smoothly within the opening in the end of the nipple 10.

When the member 18 has become seated with its flange 22 within the opening in the end of the nipple 10 the parts are locked in the following manner: The member 18 is pushed downwardly manually until the pin 17 strikes the circumferential portions 16' and 16" of the L-shaped slots 16 whereupon the barrel 15 may be given a slight turn causing the pin 17 to enter the circumferential portions 16' and 16". When the barrel is released the pressure of the spring 23 will tend to move the member 18 upward but such motion will be prevented owing to the pin 17 occupying the circumferential portions 16' and 16" of the slots 16. The strong compression force due to the spring 23 will press the member 20 firmly against the conical surface 10f of the nipple 10 and will not only lock the parts together preventing the barrel from being slid sidewise away from the nipple 10 but will also make the joint tight against escape of the lubricant which may now be applied under pressure.

In order to remove the delivery end of the tube supplying lubricant it is merely necessary to turn the barrel 15 back until the axial portions of the slots 16 coincide with the pin 17, permit the pin 17 to rise under the influence of the spring 23 to its normal position at the upper end of the slots 16 and then slide the barrel sideways in the opposite direction to that in which it was placed on the end of the nipple 10, applying sufficient pressure to lift the member 20 by the camming action of the conical surface 10f.

The packing rings 24 and 25 are provided for the purpose of making the chamber containing the spring 23 tight against the escape of lubricant under pressure. As stated before, the flanges 21 and 22 co-operate with the nipple 10 to prevent escape of lubricant through the joint formed by the nipple 10 and member 20. The packing rings 24 and 25 may be of any desired resilient material such as rubber, or leather.

The hereinbefore described construction admits of considerable modification without departing from the invention; therefore, it is the desire not to be limited to the precise arrangements shown and described, which are aforesaid, by way of illustration merely. In other words, the scope of protection contemplated is to be taken solely from the appended claims, interpreted as broadly as is consistent with the prior art.

What is claimed as new, is:

1. In a device for attaching a pressure lubricator to a part to be lubricated the combination of a nipple provided with a conical surface and a shoulder and including a check valve; a barrel movable in direction transverse to its axis to engage said nipple, said barrel being provided with a conical surface and shoulder complementary to the surface and shoulder on said nipple; spring urged means for holding said barrel in engagement with said nipple; and means comprising a member capable of movement in two directions relative to said barrel for the purpose of holding said barrel in locking engagement.

2. In means for attaching a pressure lubricator to a part to be lubricated the combination of a nipple including a check valve carried by the part to be lubricated; a barrel adapted to engage and be locked in engagement with said nipple, said barrel being cut away at its lower end so as to be movable transversely of its axis into engagement with said nipple; a member movable relative to and supporting said barrel, said member being capable of a longitudinal and circumferential movement limited by means including a pin and a slot; a locking member carried within said barrel and adapted to co-operate with said nipple and said movable member for the purpose of holding said barrel in locking engagement with said nipple; and means interposed between said movable member and said locking member for holding said locking member in locking position, said means including a spring and packing for rendering said attaching means tight against escape of lubricant.

3. A device for attaching a pressure lubricator to a part to be lubricated, the combination of a nipple having a conical outer surface, a check valve in said nipple, a barrel movable in a direction transverse to its axis to engage said nipple, a movable member within said barrel above said nipple, spring means in said barrel urging said movable member to seating engagement upon said nipple, a lubricant supply member extending into said barrel above said spring, said lubricant supply member and said movable member having passages in alignment with said nipple valve, locking means to secure said lubricant supply member and said barrel together with said spring urging said movable member tightly against said nipple, said movable member having a conical surface to engage the conical surface of said nipple.

4. A device as specified in claim 3 in which the movable member includes a flanged portion to cooperate with the upper end of the nipple and a portion to enter said nipple and unseat said check valve.

In testimony whereof I hereby affix my signature.

GEORGE KRAMER.